United States Patent [19]
Heil

[11] Patent Number: 5,502,824
[45] Date of Patent: * Mar. 26, 1996

[54] PERIPHERAL COMPONENT INTERCONNECT "ALWAYS ON" PROTOCOL

[75] Inventor: Thomas F. Heil, Easley, S.C.

[73] Assignee: NCR Corporation, Dayton, Ohio

[*] Notice: The portion of the term of this patent subsequent to Feb. 21, 2012, has been disclaimed.

[21] Appl. No.: 997,427

[22] Filed: Dec. 28, 1992

[51] Int. Cl.⁶ .................................................. G06F 13/364
[52] U.S. Cl. ............................................. 395/293; 395/856
[58] Field of Search ................................. 395/325, 275, 395/725

[56] References Cited

U.S. PATENT DOCUMENTS

| | | | |
|---|---|---|---|
| 4,766,334 | 8/1988 | Warner | 307/540 |
| 5,109,493 | 4/1992 | Banerjee | 395/325 |
| 5,291,080 | 3/1994 | Amagasaki | 307/475 |
| 5,305,443 | 4/1994 | Franzo | 395/325 |
| 5,392,407 | 2/1995 | Heil et al. | 395/325 |

*Primary Examiner*—Glenn A. Auve
*Attorney, Agent, or Firm*—George H. Gates

[57] ABSTRACT

A Peripheral Component Interconnect (PCI) bus has a protocol that guarantees that at all times, except for turn-around clocks necessary to prevent contention, that the bus is actively driven to a logic 1 or 0 by some device attached thereto. As long as all devices attached to the bus are compliant with the specification, the bus will never be left floating for long intervals, and thus the system designer is free to eliminate the pull-up resistors typically required on other buses.

7 Claims, 4 Drawing Sheets

PERIPHERAL COMPONENT INTERCONNECT "ALWAYS ON" PROTOCOL

BACKGROUND OF THE INVENTION

1. Cross-Reference to Related Applications

This application is related to:

Application Ser. No. 07/996,278, entitled "Peripheral Component Interconnect Special Cycle Protocol Using Soft Message IDs," filed on same date herewith by T. Heil, and assigned to the assignee of this application;

Application Ser. No. 07/996,277, entitled "Peripheral Component interconnect In Concurrent Architectures And As A Main Memory Bus," filed on same date herewith by T. Heil et al. and assigned to the assignee of this application; and Application Ser. No. 07/996,276, entitled "Multi-Port Processor With Peripheral Component interconnect Port and RAMBUS Port," filed on same date herewith by T. Heil et al. and assigned to the assignee of this application.

All of the above-identified applications are incorporated by reference herein.

2. Field of the Invention

This invention relates in general to interfaces between computers and input/output (I/O) devices, and in particular to a computer I/O bus.

3. Description of Related Art

A communications interface or input/output bus is typically used in computer systems to interconnect separate devices, such as processors, memories, and peripherals. Standardized interfaces such as the ISA, EISA, or Micro Channel™ buses have long been used in computer systems to provide a common I/O board interface across different platforms and different processor generations. However, there are a number of problems associated with these interfaces.

The main problem with these prior interfaces involves cost. Most performance critical peripherals are being moved to motherboards, not only for the performance advantages of processor proximity and minimal interconnect length, but also to leverage the cost and space advantages of higher levels of integration. However, complete integration with the resultant cost and space savings is hampered by lack of a standard component interconnect and the necessity of "glue logic" to connect to the variety of processors and peripheral devices to buses.

Another problem with these prior interfaces involves performance constraints. Standard I/O expansion buses are performance limiting, due to general access latency and the severe bandwidth constraints felt by high performance devices, particularly graphics devices and future communication devices such as fiber LANs.

Further, as highly integrated, performance critical peripheral controllers migrate closer to the processor, there is significant pressure to put them on the "processor treadmill." In other words, these parts are under pressure to track the frequent changes in processor bus frequencies, widths, protocols (e.g., bursting), and signalling standards (e.g., 3 volts). Unnecessarily placing peripheral parts on this treadmill increases system costs and delays the availability of leading edge systems.

Still another problem with prior interfaces involves reliability. As the industry moves toward distributed processing, client systems will become a reliability burden (the weak link) in distributed systems, and therefore will be under pressure to offer levels of reliability and fault containment previously reserved for larger server systems.

SUMMARY OF THE INVENTION

To overcome the limitations in the prior art described above, and to overcome other limitations that will become apparent upon reading and understanding the present specification, the present invention discloses a Peripheral Component Interconnect (PCI) bus having a protocol that guarantees that at all times, except for turn-around clocks necessary to prevent contention, the bus is actively driven to a logic 1 or 0 by some device attached thereto. As long as all devices attached to the bus are compliant with the specification, the bus will never be left floating for long intervals, and thus the system designer is free to eliminate the pull-up resistors typically required on other buses.

The PCI bus is a physical interconnect apparatus intended for use between highly integrated peripheral controller components and processor/memory systems. The PCI bus is intended as a standard interface at the component level in much the same way that ISA, EISA, or Micro Channel™ buses are standard interfaces at the board level. Just as ISA, EISA, and Micro Channel™ buses provide a common I/O board interface across different platforms and different processor generations, the PCI bus is intended to be a common I/O component interface across different platforms and different processor generations.

The specification for the PCI bus is intended to standardize local bus on which a large variety of I/O components can directly connect without "glue" logic, i.e., direct component interconnection. This direct component interconnection results in several benefits which will become readily apparent upon an understanding of the features of the present invention, and the advantages that derive therefrom.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
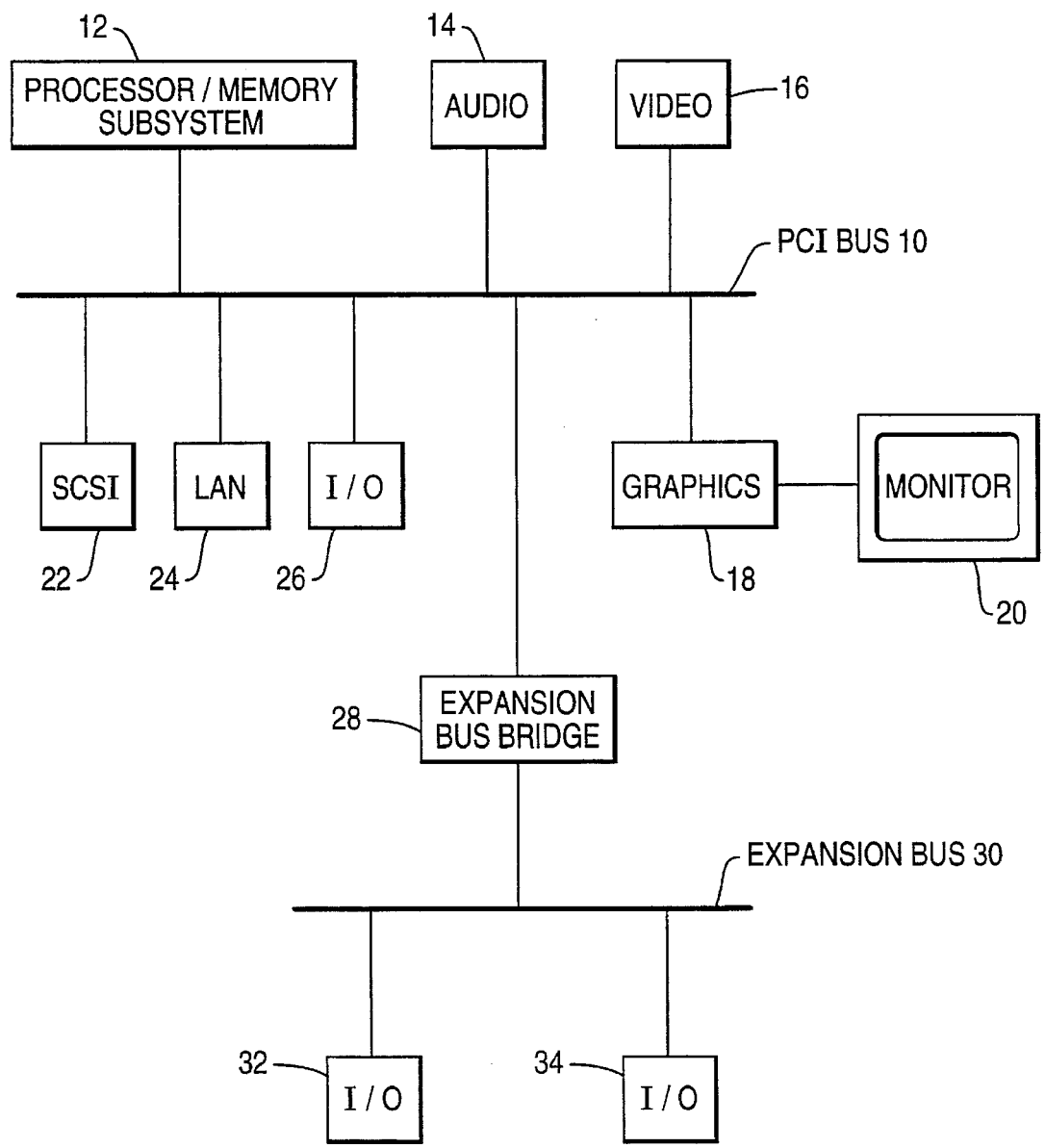
FIG. 1 is a block diagram of an example configuration using the PCI bus.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Introduction

The present application describes several inventive features of an interface or bus for computer systems termed the Peripheral Component Interconnect (PCI). A more complete discussion of the PCI bus is available in the document *Peripheral Component Interconnect (PCI), Revision 1.0 Specification,* Jun. 22, 1992, incorporated by reference herein.

A PCI bus is a physical interconnect apparatus intended for use between highly integrated peripheral controller components and processor/memory systems. A PCI bus is intended as a standard interface at the component level in much the same way that ISA, EISA, or Micro Channel™ buses are standard interfaces at the board level. Just as ISA, EISA, and Micro Channel™ buses provide a common I/O board interface across different platforms and different processor generations, the PCI bus is intended to be a common I/O component interface across different platforms and different processor generations.

The specification for the PCI bus is intended to standardize a local bus on which a large variety of I/O components can directly connect without "glue" logic, i.e., direct component interconnection. The goal of direct component interconnection results in several advantages:

Electrical driver and frequency specifications within the reach of ASICs and other VLSI devices.

Cost decreases and reliability enhancements due to a lower parts count, smaller power budget, and higher density packaging.

Performance advantages due to a high speed local bus.

A system I/O core design decoupled from the processor/memory treadmill, thus allowing it to survive multiple generations of processor/memory technology.

A manageable protocol providing a large variety of I/O functions with a common physical interface.

PCI Bus "Always On" Protocol

The PCI specification provides a bus protocol mechanism that guarantees that at all times (except for turn-around clocks necessary to prevent contention), the bus is actively driven to a logic 1 or 0 by some device attached thereto. As long as all devices attached to the bus are compliant with the specification, the bus will never be left floating for long intervals, and thus the system designer is free to eliminate the pull-up resistors typically required on other buses.

The elimination of pull-ups on a bus that does not guarantee signals are always driven runs the risk of the bus floating near the switch threshold voltage. This leads to increased power consumption and noise, especially for CMOS devices. The present invention avoids these problems and yet still provides a means for eliminating pull-up resistors, thereby realizing cost savings, space savings on printed circuit boards, as well as reduced power requirements.

System Description

FIG. 1 is a block diagram of an example configuration using the PCI bus 10. A processor/memory subsystem 12 is coupled to the PCI bus 10, as are such peripherals as audio boards 14, video boards 16, video graphics controllers 18 for monitors 20, SCSI peripherals 22, LAN interfaces 24, and other I/O devices 26. Bridge interface logic 28 couples the PCI bus 10 to a standard expansion bus 30 and provides access therebetween for various expansion I/O boards 32, 34. Those skilled in the art will recognize that this example configuration is not intended to imply any specific architectural limits.

In the present invention, a processor/memory subsystem 12 may directly access peripheral devices mapped anywhere in the memory or I/O address spaces via a PCI bus 10. Components connected to the PCI bus 10 may be any one of three classes: master, slave, or master-slave combination. Provided these components are all compliant with the PCI specification, the PCI bus 10 becomes a VLSI interconnect, with no "glue" logic necessary. However, if it is necessary to attach components to the bus that are not compliant with the PCI specification, then specialized logic devices can be used to make the connection to the PCI bus.

Signal Definition

Figure 2:
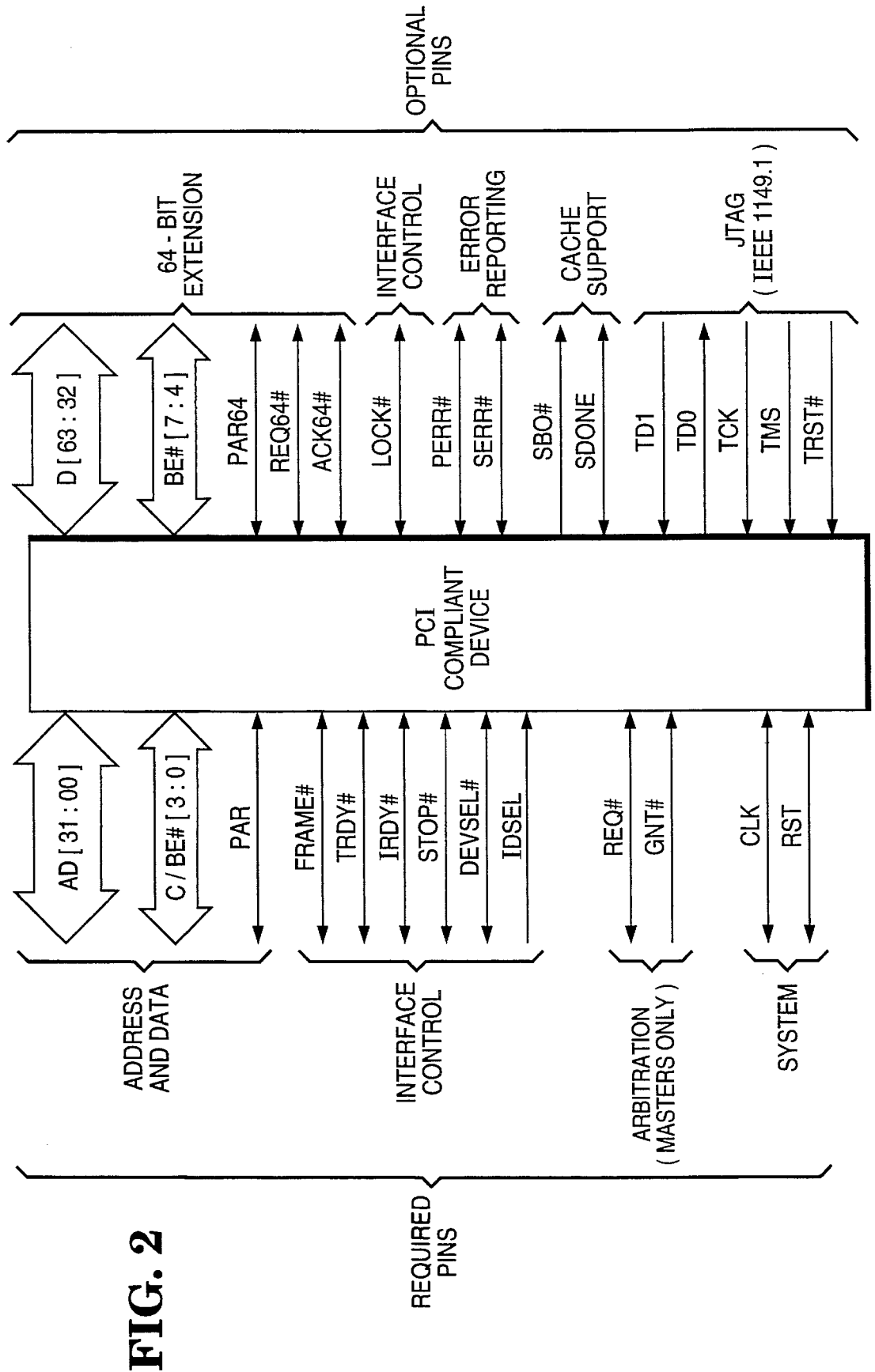
FIG. 2 illustrates the signal definitions of the PCI bus according to the present invention.

FIG. 2 illustrates the signal definitions of the PCI bus according to the present invention. The PCI bus requires a minimum of 45 pins for a slave-only device and 47 pins for a master-only or master-slave device to handle data and addressing, interface control, arbitration, and system functions. Optional error reporting requires two additional pins. The pins in FIG. 2 are shown in functional groups, with required pins on the left side and optional pins on the right side. The direction indication on the signals in FIG. 2 assumes a combination master-slave device. A selected subset of the signals are described below in more detail. For more information on the other signals, refer to the document *Peripheral Component Interconnect (PCI), Revision 1.0 Specification*, Jun. 22, 1992, incorporated by reference herein.

Note that there are certain conventions to the signal names defined below:

1. The # symbol at the end of a signal name indicates that the active state occurs when the signal is at a low voltage; otherwise, the signal is active at a high voltage.

2. The "(in)" symbol indicates a standard input-only signal.

3. The "(out)" symbol indicates a totem pole output, i.e., a standard active driver.

4. The "(t/s)" symbol indicates a tri-state signal, i.e., a bi-directional, tri-state, input/output signal.

5. The "(s/t/s)" symbol indicates a sustained tri-state signal, i.e., an active low tri-state signal owned and driven by one device at a time. The device that drives a (s/t/s) signal low must drive it high for at least one clock before letting it float. A new device cannot start drive a (s/t/s) signal any sooner than one clock after the previous owner tri-states it. A pull-up is required to sustain the inactive state until another device drives it, and must be provided by a central resource.

System Signals

CLK (in)

The CLK (Clock) signal provides timing for all transactions on the PCI bus and is an input to every device. All other PCI bus signals are sampled on the rising edge of the CLK signal, and all other timing parameters are defined with respect to this edge. It is expected that the PCI bus may operate over a wide range of frequencies for the CLK signal.

AD[31::00] (t/s)

The AD (Address and Data) signals are multiplexed on the same pins of the PCI bus. During the first clock of a transaction, the AD signals contain a 32-bit target device address. During subsequent clocks, the AD signals contain up to 4 bytes of data.

C/BE#[3::0] (t/s)

The C/BE (Bus Command and Byte Enable) signals are multiplexed on the same pins of the PCI bus. During the address phase of a transaction, the C/BE# signals define a bus command. During the data phase of the transaction, the C/BE# signals are used as "Byte Enables" for the 32 AD signals. The Byte Enables determine which byte lanes, i.e., 8-bit groups, of the AD signals carry meaningful data. For example, the C/BE#[0] signal applies to byte 0 of the AD signals, and the C/BE#[3] signal applies to byte 3 of the AD signals.

Interface Control Signals

FRAME# (s/t/s)

The FRAME# (Cycle Frame) signal is driven by the current master device to indicate the beginning and duration of an access. The FRAME# signal is asserted to indicate a bus transaction is beginning. While the FRAME# signal is asserted, data transfers continue. When the FRAME# signal is de-asserted, the transaction is in the final data phase.

TRDY# (s/t/s)

The TRDY# (Target Ready) signal indicates the target device's ability to complete the current data phase of the transaction. The TRDY# signal is used in conjunction with the IRDY# signal described below. A data phase is completed on any clock where both the TRDY# and IRDY# signals are asserted. During a read, the TRDY# signal indicates that valid data is present on the AD signals. During a write, the TRDY# signal indicates that the target device is prepared to accept data. Wait cycles are inserted until both the IRDY# and TRDY# signals are asserted together.

IRDY# (s/t/s)

The IRDY# (Initiator Ready) signal indicates the initiating device's (master device's) ability to complete the current data phase of the transaction. The IRDY# signal is used in conjunction with the TRDY# signal. A data phase is completed on any clock that both the IRDY# and TRDY# signals are asserted. During a write, the IRDY# signal indicates that valid data is present on the AD signals. During a read, the IRDY# signal indicates that the master device is prepared to accept data. Wait cycles are inserted until both the IRDY# and TRDY# signals are asserted together.

DEVSEL# (s/t/s)

The DEVSEL (Device Select) signal, when actively driven, indicates that the driving device has decoded its address as the target device for the current transaction. As an input, the DEVSEL# signal indicates whether any device on the bus has been selected.

Arbitration (Master Devices Only)

REQ™ (out)

The REQ# (Request) signal indicates to a central bus arbiter that the device desires use of the bus. The REQ# signal is a point-to-point signal, and every master device and master-slave device has its own REQ# signal connection with the arbiter.

GNT# (in)

The GNT# (Grant) signal indicates to the device that access to the bus has been granted by the arbiter. The GNT# signal is a point-to-point signal, and every master device and master-slave device has its own GNT# signal connection with the arbiter.

Basic Transaction Control

In order to minimize access latency, the PCI specification uses an arbitration approach to bus transactions the is access-based, rather than time-slot-based. Thus, a master device must arbitrate for each access it performs on the bus.

Preferably, a central arbitration scheme is used, wherein each master device has a unique request (REQ#) and grant (GNT#) signal connected to the central arbiter device. A simple request-grant handshake between the arbiter and the master device is used to gain access to the bus.

A specific arbitration algorithm must be implemented by the arbiter, e.g., priority, rotating priority, fair, etc. An arbitration algorithm must be defined to establish a basis for a worst case latency guarantee. The arbitration occurs during a previous access so that no PCI bus cycles are consumed due to arbitration algorithm. The arbiter can implement any scheme as long as only a single GNT# is asserted on any clock.

A device requests the bus by asserting its REQ# signal. When the arbiter determines a device may use the bus, it asserts the device's GNT# signal. The arbiter may de-assert a device's GNT# signal on any clock. Therefore, a device must insure its GNT# is asserted on the clock edge it wants to start a transaction. If the GNT# signal is de-asserted, then the transaction must not proceed.

The GNT# signal normally gives a device access to the bus for a single transaction. If the device desires another access, it should continue to assert its REQ# signal. A device may de-assert its REQ# signal anytime, but the arbiter may interpret his to mean the device no longer requires use of the bus and may de-assert the device's GNT# signal.

The PCI bus may use "arbitration parking," wherein the arbiter asserts the GNT# signal to a selected device when no device is currently using or requesting the bus. The arbiter can select this default owner any way it wants (e.g., fixed, last used, etc.) or can choose not to park at all, thereby effectively designating itself as the default owner. When the arbiter asserts a device's GNT# signal and the bus is idle, that device must enable its AD and C/BE# signal buffers. This requirement insures the arbiter can safely park the bus at some device and know that the bus will not float. If the arbiter does not park the bus, the central resource device in which the arbiter is embedded typically drives the bus, i.e., effectively designating the central resource device as the default owner of the bus.

If the bus is idle and the arbiter de-asserts a device's GNT# signal, the device has lost access to the bus, except in one case. The one case is when the arbiter de-asserts the GNT# signal coincident with the device asserting the FRAME# signal. In this case, the device will continue the transaction. Otherwise, the device must tri-state the AD and C/BE# signals. The device must disable all buffers in a single clock to avoid possible contention with the next bus owner.

After bus ownership has been granted to a master device, the FRAME# signal is asserted by being driven to a low voltage by the master device to indicate the beginning of the transaction. The first clock edge on which the FRAME# signal is asserted is the address phase, and the address and bus command code are transferred by the AD and C/BE# signals on that clock edge. The next clock edge begins the first of one or more data phases, during which data is transferred by the AD signals between the master device and the target device on each clock edge for which both the IRDY# and TRDY# signals are asserted by the master device and the target device, respectively. Wait cycles may be inserted in a data phase by either the master device or the target device with the IRDY# and TRDY# signals.

At such time as the master device intends to complete only one more data transfer (which could be immediately after the address phase), the FRAME# signal is de-asserted and the IRDY# signal is asserted indicating the master device is ready. After the target device indicates the final data transfer, by asserting the TRDY# signal, the PCI bus returns to the idle state with both the FRAME# and IRDY# signals de-asserted.

Bus Driving and Turnaround

A turn-around-cycle is required on all signals that may be driven by more than one device. The turn-around-cycle is required to avoid contention when one device stops driving a signal and another device begins, and must last at least one clock. This is indicated on the timing diagrams of FIGS. 3 and 4 as two arrows pointing at each others' tail. This turn-around-cycle occurs at different times for different signals. For example, the IRDY#, TRDY# and DEVSEL# signals use the address phase as their turn-around-cycle, while the FRAME#, C/BE# and AD signals use the idle cycle between transactions as their turn-around-cycle. An idle cycle occurs when both the FRAME# and IRDY# signals are de-asserted.

All of the AD signals must be driven to stable values during every address and data phase. In addition, byte lanes of the AD signals not involved in a current data transfer must physically drive stable (albeit meaningless) data onto the bus. The motivation is to keep input buffers on byte lanes not involved in the transfer from switching at the threshold level, and more generally, to facilitate fast metastability free latching. In the interest of minimizing bus switching power consumption, byte lanes not being used in the current bus phase should be driven with the same data as contained in the previous bus phase. The output buffers may have a built-in latch or dynamic flip-flop to capture that data from clock to clock.

Read Transaction

Figure 3:
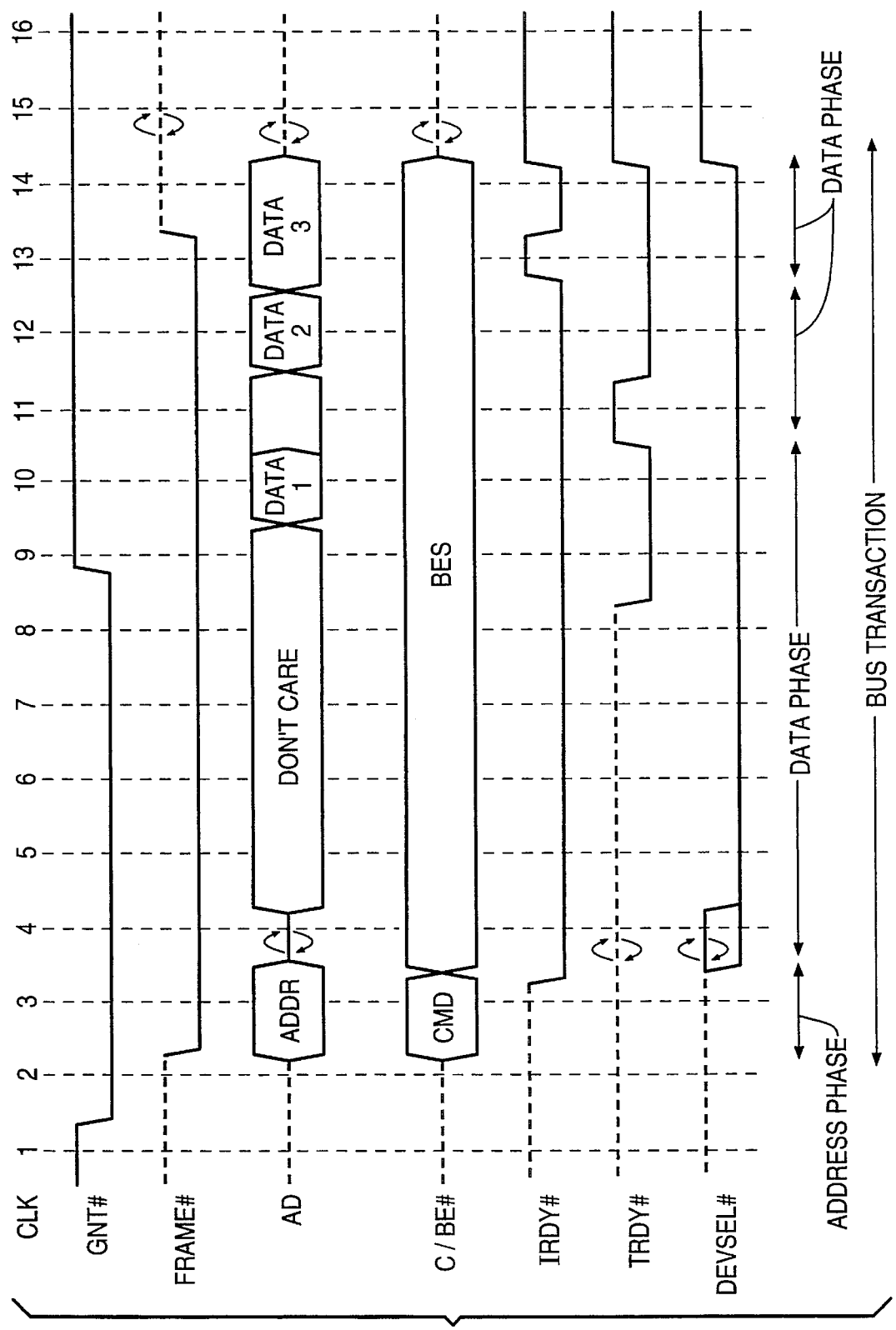
FIG. 3 illustrates a read transaction on the PCI bus.

FIG. 3 illustrates a read transaction on the PCI bus. The master device must enable its AD and C/BE# signal drivers when it is granted bus ownership, i.e., after the GNT# signal is asserted by the arbiter. The read transaction starts with an address phase which occurs when the FRAME# signal is asserted for the first time and occurs in clock period 2. The AD signals contain a target device address and the C/BE# signals contain a bus command.

A turn-around-cycle occurs in clock period 3 to avoid contention when the master device stops driving the AD signals and the target device begins driving the AD, TRDY#, and DEVSEL# signals. This is indicated on the timing diagram of FIG. 3 as two arrows pointing at each others' tail. The turn-around-cycle lasts from clock period 3 until clock period 4. The target device must enable its AD signal drivers at clock period 4, as soon as it decodes an address identifying itself as the selected target device of the current cycle, even though it may not supply the requested data on the AD signals for some time. This ensures that, if the bus is stalled waiting for a slow target device to drive requested data onto the bus, that the AD signals are not allowed to float.

The earliest the target device can provide valid data is clock period 9, as enforced by the target device via the TRDY# signal. During the data phase, the C/BE# signals indicate which byte lanes are involved in the current data phase. The C/BE# signal buffers must remain enabled regardless of whether data is transferred to ensure that they are not left floating.

A data phase completes when data is transferred, which occurs when both the IRDY# and TRDY# signals are asserted on the same clock edge. When either signal is de-asserted, a wait cycle is inserted and no data is transferred. As noted in the diagram, data is successfully transferred on clock edges 10, 12, and 14, and wait cycles are inserted on clock edges 11, and 13. The first data phase completes in the minimum time for a read transaction, i.e., from clock edge 9 through clock edge 10. The second data phase is extended on clock edge 11 because the TRDY# signal is de-asserted by the target device to force a wait cycle. The last data phase is extended on clock edge 13 because the IRDY# signal is de-asserted by the master device to force a wait cycle.

The master device knows at clock edge 14 that the next data phase is the last. However, because the master device is not ready to complete the last transfer when the IRDY# signal is de-asserted on clock 13, the FRAME# signal stays asserted. Only when the IRDY# signal is asserted on clock edge 14 can the FRAME# signal be de-asserted, which occurs on clock edge 14.

Write Transaction

Figure 4:
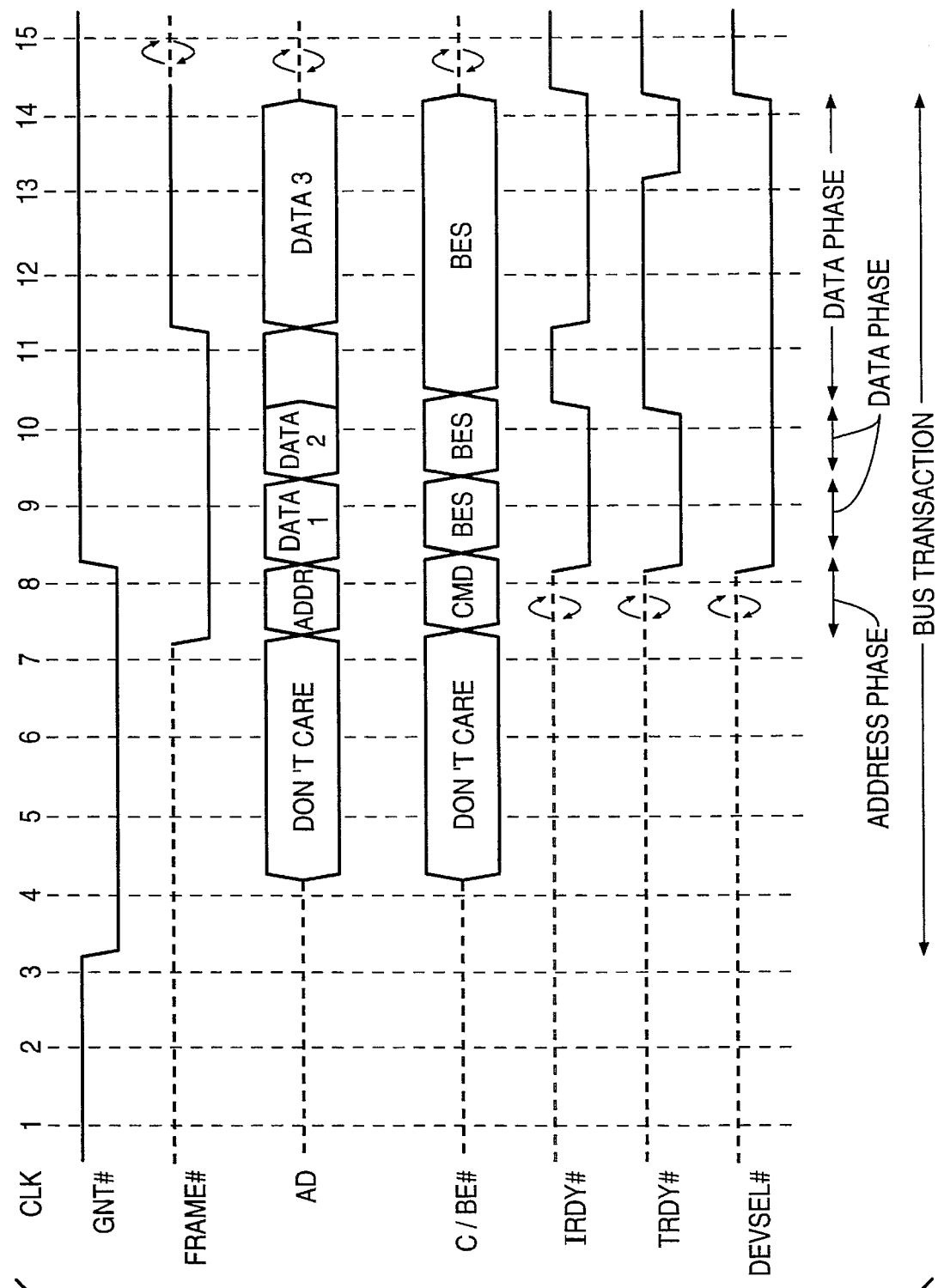
FIG. 4 illustrates a write transaction on the PCI bus.

FIG. 4 illustrates a write transaction on the PCI bus. The master device must enable its AD and C/BE# signal drivers when it is granted bus ownership, i.e., when the GNT# signal is asserted by the arbiter. The write transaction starts with an address phase which occurs when the FRAME# signal is asserted for the first time on clock edge 8 at which time the AD signals contain a target device address and the C/BE# signals contain a bus command. A write transaction is similar to a read transaction except that no turn-around-cycle is required following the address phase because the master device drives the AD and C/BE# signals for the entire transaction.

The data phases work the same as in the read transaction. The first and second data phase complete with no wait cycles. However, the third data phase has three wait cycles inserted by the target device. Both devices insert a wait cycle on clock edge 11, and the target device inserts wait cycles on clock edges 12 and 13.

The IRDY# signal must be asserted when the FRAME# signal is de-asserted indicating the last data phase. The data transfer is delayed by the master device on clock edge 11 because the IRDY# signal is de-asserted. Although this allows the master device to delay data, it does not allow the Byte Enables of the AD signals to be delayed. The last data phase is signaled by the master device on clock edge 12, but does not complete until clock edge 14.

Transaction Termination

Termination of a transaction may be initiated by either the master device or the target device. While neither can actually stop the transaction unilaterally, the master device remains in ultimate control, bringing all transactions to an orderly and systematic conclusion regardless of what caused the termination. All transactions are concluded when the FRAME# and IRDY# signals are both de-asserted, thereby indicating an idle cycle.

Because arbitration has occurred during the transaction, the arbiter asserts the GNT# signal to the next selected device before the end of the current transaction. The next selected device waits for the de-assertion of the FRAME# and IRDY# signals to indicate the end of the transaction. At that time, the next selected device must enable its AD and C/BE# signal buffers, thereby ensuring that the bus will not float. Thus, the GNT# signal provides a device with access to the bus for only a single transaction. If the device desires further access to the bus for another transaction, it should continue to assert its REQ# signal for service again by the arbiter.

Conclusion

In summary, a Peripheral Component Interconnect (PCI) bus has been described for component level interconnection of processors, peripherals and memories. The PCI bus includes a protocol that guarantees that at all times, except for turn-around clocks necessary to prevent contention, that the bus is actively driven to a logic 1 or 0 by some device attached thereto. As long as all devices attached to the bus are compliant with the specification, the bus will never be left floating for long intervals, and thus the system designer is free to eliminate the pull-up resistors typically required on other buses.

The foregoing description of the preferred embodiment of the present invention has been presented only for the purposes of illustration and description. The foregoing description is not intended to be exhaustive or to limit the invention to the precise form disclosed. Many modifications and variations are possible in light of the teaching herein. For example, the following paragraphs describe some alternatives in accomplishing the same invention.

Those skilled in the art will recognize that the present invention is applicable to buses with different pin counts and different signal definitions. The pin counts and signal definitions cited in the present specification are for illustrative purposes only and are not intended to be exhaustive or to limit the invention to the precise form disclosed.

Those skilled in the art will recognize that the present invention is applicable to systems with different configurations of devices and components. The example configurations of devices and components cited in the present specification are for illustrative purposes only and are not intended to be exhaustive or to limit the invention to the precise form disclosed.

Those skilled in the art will recognize that the present invention is applicable to buses with different electrical characteristics. The electrical characteristics cited in the present specification are for illustrative purposes only and are not intended to be exhaustive or to limit the invention to the precise form disclosed.

Those skilled in the art will recognize that the present invention is applicable to buses with different transaction types, including transactions with different functional sequences. The transactions cited in the present specification are for illustrative purposes only and are not intended to be exhaustive or to limit the invention to the precise form disclosed.

It is intended that the scope of the invention be limited not by this detailed description, but rather by the claims appended hereto.

What is claimed is:

1. A component interconnect apparatus, comprising:
   (a) a plurality of electrically conductive signal connections coupled between a plurality of electronic devices for communicating electrical signals between the electronic devices,
   (b) a central arbiter device for selecting by arbitration a first one of the electronic devices for actively and exclusively driving one or more of the electrically conductive signal connections to a logic 1 or 0 value during a first time period, and for selecting by arbitration a second device for actively and exclusively driving the electrically conductive signal connections to a logic 1 or 0 value during a second time period following the first time period, so that the electrically conductive signal connections are never left floating for an extended period, thereby eliminating the need for pull-up resistors coupled to the electrically conductive signal connections;
   (c) each electronic device that requests exclusive control of the electrically conductive signal connections having a request signal line and grant signal line connected to the central arbiter device, the request signal line indicating to the central arbiter device that the device desires use of the electrically conductive signal connections, and the grant signal line indicating to the device that access to the electrically conductive signal connections has been granted by the central arbiter device; and
   (d) the central arbiter device further comprising arbitration parking means for asserting the grant signal line to a selected device not requesting access to the electrically conductive signal connections when no other device is requesting access to the electrically conductive signal connections, thereby effectively designating the selected device as a default owner of the electrically conductive signal connections, so that the electrically conductive signal connections will not float.

2. The apparatus as set forth in claim 1 above, wherein the electrically conductive signal connections comprise a plurality of signal lines for device addressing, data transfer, bus control, bus arbitration, and system functions.

3. The apparatus as set forth in claim 1 above, wherein a turnaround time period exists between the first and second time periods to prevent contention between the first and second electronic devices for the electrically conductive signal connection.

4. The apparatus as set forth in claim 1 above, wherein a device must enable its output buffers to one or more of the electrically conductive signal connections when the central arbiter device asserts the grant signal to the device, thereby ensuring that the electrically conductive signal connection will not float.

5. A component interconnect apparatus, comprising:
   (a) a plurality of electronic devices;
   (b) a bus, comprising plural electrically conductive signal connections coupled between the electronic devices, for communicating electrical signals between the electronic devices; and
   (c) central arbiter means for selecting by arbitration a first one of the electronic devices for actively and exclusively driving the plural electrically conductive signal connections to a logic 1 or 0 during a first time period, and for selecting by arbitration a second device for actively and exclusively driving the electrically conductive signal connections to a logic 1 or 0 value during a second time period following the first time period so that the electrically conductive signal connections are never left floating except for turn-around periods necessary to prevent contention between the electronic devices, thereby eliminating the need for pull-up resistors coupled to the electrically conductive signal connections;
   (d) each electronic device that requests exclusive control of the electrically conductive signal connections having a request signal line and grant signal line connected to the central arbiter device, the request signal line indicating to the central arbiter device that the device desires use of the electrically conductive signal connections, and the grant signal line indicating to the device that access to the electrically conductive signal connections has been granted by the central arbiter device; and (e) the central arbiter device further comprising arbitration parking means for asserting the grant signal line to a selected device not requesting access to the electrically conductive signal connections when no other device is requesting access to the electrically conductive signal connections, thereby effectively designating the selected device as a default owner of the electrically conductive signal connections, so that the electrically conductive signal connections will not float.

6. The apparatus as set forth in claim 5 above, wherein the electrically conductive signal connections comprise a plurality of signal lines for device addressing, data transfer, bus control, bus arbitration, and system functions.

7. The apparatus as set forth in claim 5 above, wherein a turnaround time period exists between the first and second time periods to prevent contention between the first and second electronic devices for the electrically conductive signal connection.

* * * * *